2 Sheets—Sheet 2.
M. T. JACKSON.
Vehicle Pole and Shaft.
No. 225,221. Patented Mar. 9, 1880.
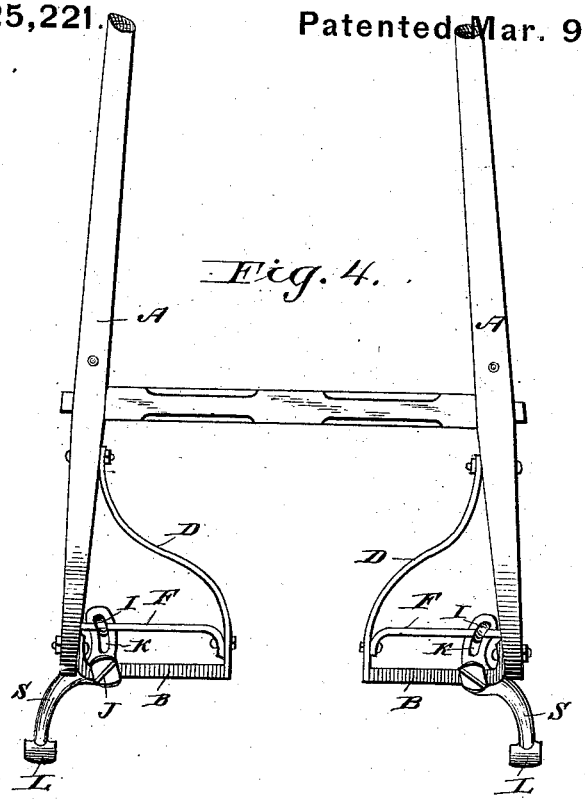
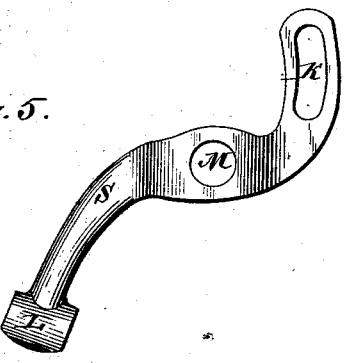
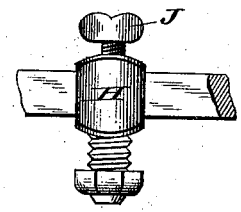
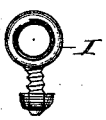
Attest.
A. M. Long.
Wm. T. Henderson
M. T. Jackson.
Inventor.
By H. T. Abbot,
Atty.
N. PETERS, PHOTO-LITHOGRAPHER, WASHINGTON, D. C.

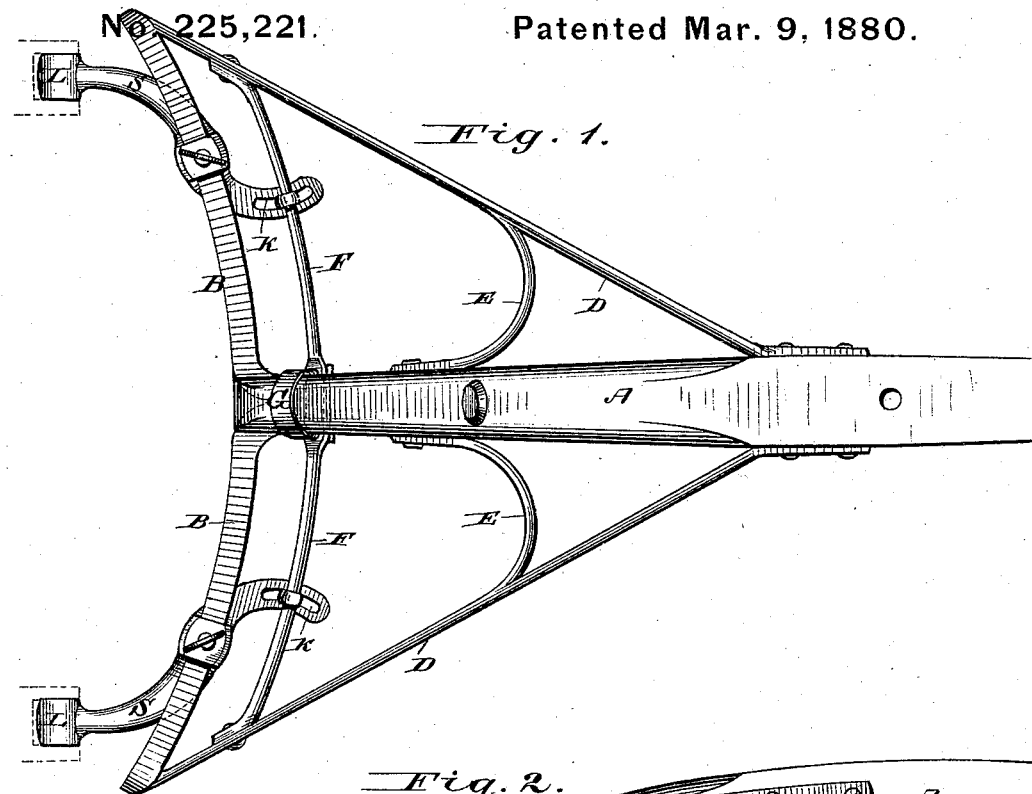

UNITED STATES PATENT OFFICE.

MOSES T. JACKSON, OF MONTROSE, PENNSYLVANIA.

VEHICLE POLE AND SHAFT.

SPECIFICATION forming part of Letters Patent No. 225,221, dated March 9, 1880.

Application filed August 22, 1879.

*To all whom it may concern:*

Be it known that I, MOSES T. JACKSON, of Montrose, in the county of Susquehanna and State of Pennsylvania, have invented certain new and useful Improvements in Vehicle Poles and Shafts; and I do hereby declare the following to be a full, clear, and exact description of the invention, such as will enable others skilled in the art to which it appertains to make and use the same, reference being had to the accompanying drawings, and to letters of reference marked thereon, which form a part of this specification, in which—

Figure 1 is a plan view of the pole with the coupling-eyes; Fig. 2, a side view; Fig. 3, a perspective from the rear of the pole, with a section cut away. Fig. 4 is a plan view, showing a modification of my device. Figs. 5, 6, and 7 are detached views of particular parts.

My invention relates to devices for coupling the poles or shafts of vehicles to the axles, especially to those devices that are adjustable crosswise, so as to adapt the pole-coupling to the distance apart of the clips; and it consists in a coupling-eye constructed substantially as hereinafter described, whereby it may be slid from near the pole or shaft to the end of the transverse bar or bars upon which it slides, and also be turned so as to keep the eye in line with the clip on the axle.

It also further consists in the construction of the other parts of the device, as hereinafter described.

In the accompanying drawings, the letter A indicates a vehicle-pole having a transverse bar, B, at the end, held in place by a longitudinal bar, C, forming a part thereof, and bolted to the under side of the pole, and braced by the stays D, which are bolted to the pole, the said stays being stiffened by the braces E, extending therefrom to the pole, to which they are bolted.

A rod, F, is placed back of the transverse bar B, and held in place by being bolted or riveted to the stays D, and by a clip, G, passed over the pole and through said bar at the lower part of the pole, to which it is held by nuts screwed onto its ends. The transverse bar and this rod are shown as curved, the one being angular and the other round. It is to be understood, however, that they are not of necessity made so, for they may both be angular or round, straight or curved. To this bar and this rod is connected the eye S by means of two bolts, H I, made with eyed heads, so that they may fit over and slide upon the bar and rod, the bolt H having a hole through its top for the passage of a thumb locking-screw, J, therethrough.

The eye S is of an ogee form—that is, with its two ends turned in opposite directions—and has an elongated slot, K, in one end, a socket, L, in the other end, and a hole, M, through it between its two ends. The eye, thus constructed, is secured to the bar and the rod by passing the bolt H through the hole M and the bolt I through slot K and screwing nuts onto the ends of the bolts. By screwing the said nuts up tight the eye is prevented from turning, as the nuts press it against the head of bolt H and the rod F, and clamp it there.

The nut to the bolt I to some extent prevents the eye from slipping laterally; but that slipping is most effectually prevented by the thumb-screw J, which impinges against the bar B and holds the eye very rigidly in position.

When it is desired to adjust the eyes S to the clips of an axle the thumb-screw J and the nut to bolt I are loosened and the eye slipped along to the required position; and to adjust the eye to the line of the clip the nut to bolt H is loosened (that to the other bolt being already loose) and the eye turned to the right or left, as may be necessary, after which the parts are securely fastened, as before.

By bolting the eye to both bar B and rod F additional strength and rigidity are given to it.

This form and construction of eye can be applied to shafts as well as to poles. When such is the case both shafts are provided with a bar, B, and rod F, which are braced by the stays D. The eye S is constructed, held in position, and adjusted by bolts, screws, and nuts, as hereinbefore described; and shafts with these eyes affixed to them can be used on any wagon, and very quickly adjusted thereto.

The several parts are made of material usually used for such purposes, and by means of the nut they can be tightened up so as to prevent rattling.

Having described my invention, what I claim is—

1. A vehicle pole or shaft, in combination with a transverse bar and an eye for coupling to the axle, the eye pivoted to said bar and admitting of adjustment along its length, for the purposes set forth.

2. The eye S, provided with socket L and elongated slot K, for the purpose set forth.

3. The combination of a pole or shaft, A, a tranverse bar, B, and an eye for coupling to the axle, the eye adjustable along the length of bar B, and secured thereto by the eye-headed bolt and locking-screw, substantially as and for the purpose set forth.

4. The combination of a vehicle pole or shaft, a transverse bar and rod, and an adjustable coupling-eye, connected to both bar and rod by locking devices, substantially as set forth.

5. A vehicle pole or shaft, in combination with bar B, rod F, eye S, constructed substantially as described, bolts H and I, and locking-screw J, for the purpose set forth.

6. A vehicle pole or shaft, in combination with transverse bar B and adjustable coupling-eye, bolt H, and locking-screw J, for the purpose set forth.

In testimony that I claim the foregoing I have hereunto set my hand this 20th day of August, 1879.

MOSES T. JACKSON.

Witnesses:
W. G. PARKE,
W. A. TAYLOR.